(12) United States Patent
Jette

(10) Patent No.: US 6,347,493 B1
(45) Date of Patent: Feb. 19, 2002

(54) RAISED FLOOR SYSTEM AND SUPPORT APPARATUS

(76) Inventor: Roger Jette, 17 Prospect St., Babylon, NY (US) 11702

(*) Notice: Subject to any disclaimer, the term of this patent is extended or adjusted under 35 U.S.C. 154(b) by 0 days.

(21) Appl. No.: 09/524,033

(22) Filed: Mar. 13, 2000

Related U.S. Application Data

(63) Continuation-in-part of application No. PCT/US98/19051, filed on Sep. 11, 1998, and a continuation-in-part of application No. 08/927,506, filed on Sep. 11, 1997, now Pat. No. 5,953,870.
(60) Provisional application No. 60/063,426, filed on Oct. 28, 1997.

(51) Int. Cl.⁷ .................................................. E04B 5/48
(52) U.S. Cl. ..................... 52/220.1; 52/126.2; 52/263; 248/49
(58) Field of Search .......................... 52/220.1, 126.2, 52/263; 248/49

(56) References Cited

U.S. PATENT DOCUMENTS

| | | |
|---|---|---|
| 3,363,048 A | 1/1968 | Vaughn |
| 3,844,440 A | 10/1974 | Hadfield et al. |
| 4,124,324 A | 11/1978 | Augis et al. |
| 4,372,510 A | 2/1983 | Skypala |
| 4,593,499 A | 6/1986 | Kobayashi et al. |
| 4,596,095 A | 6/1986 | Chalfant |
| 4,612,746 A | 9/1986 | Higgins |
| 4,630,417 A | 12/1986 | Collier |
| 4,676,036 A | 6/1987 | Bessert |
| 4,765,576 A | 8/1988 | Peled |
| 4,850,162 A | 7/1989 | Albrecht |
| 5,049,700 A | 9/1991 | Kobayashi et al. |
| 5,123,618 A | 6/1992 | Gutterman et al. |
| 5,263,289 A | 11/1993 | Boyd |
| 5,389,737 A | 2/1995 | Kobayashi et al. |
| 5,412,914 A | 5/1995 | Daw et al. |
| 5,477,649 A | 12/1995 | Bessert |
| 5,483,776 A | 1/1996 | Poppe |
| 5,531,410 A * | 7/1996 | Simon .......................... 248/49 |
| 5,546,717 A * | 8/1996 | Penczak ..................... 52/220.5 |
| 5,548,932 A | 8/1996 | Mead |
| RE35,479 E | 3/1997 | Witherbee et al. |
| 5,628,157 A | 5/1997 | Chen |
| 5,630,300 A | 5/1997 | Chen |
| 5,673,522 A | 10/1997 | Schilham |
| 5,697,193 A | 12/1997 | Forslund, III et al. |
| 5,768,840 A | 6/1998 | Feldpausch et al. |
| 5,953,870 A * | 9/1999 | Jette .......................... 52/220.1 |

FOREIGN PATENT DOCUMENTS

| | | |
|---|---|---|
| DE | 2155 625 | 11/1971 |
| EP | 0399 790 | 5/1990 |
| EP | 0 683 554 A1 | 5/1994 |
| FR | 2 599 906 | 6/1986 |
| GB | 2 015 268 | 9/1979 |
| WO | WO 90/10966 | 9/1990 |

* cited by examiner

Primary Examiner—Beth A. Stephan
(74) Attorney, Agent, or Firm—Dilworth & Barrese, LLP

(57) ABSTRACT

A support apparatus for use with a raised floor system including a plurality of support pedestals and floor panels, includes a support bracket having first and second end portions being configured and dimensioned to rest upon a portion of a support pedestal. An intermediate portion extends between the first and second end portions, and an article support member depends from the intermediate portion to support articles thereon a distance below the raised floor panels and a distance above a base.

20 Claims, 15 Drawing Sheets

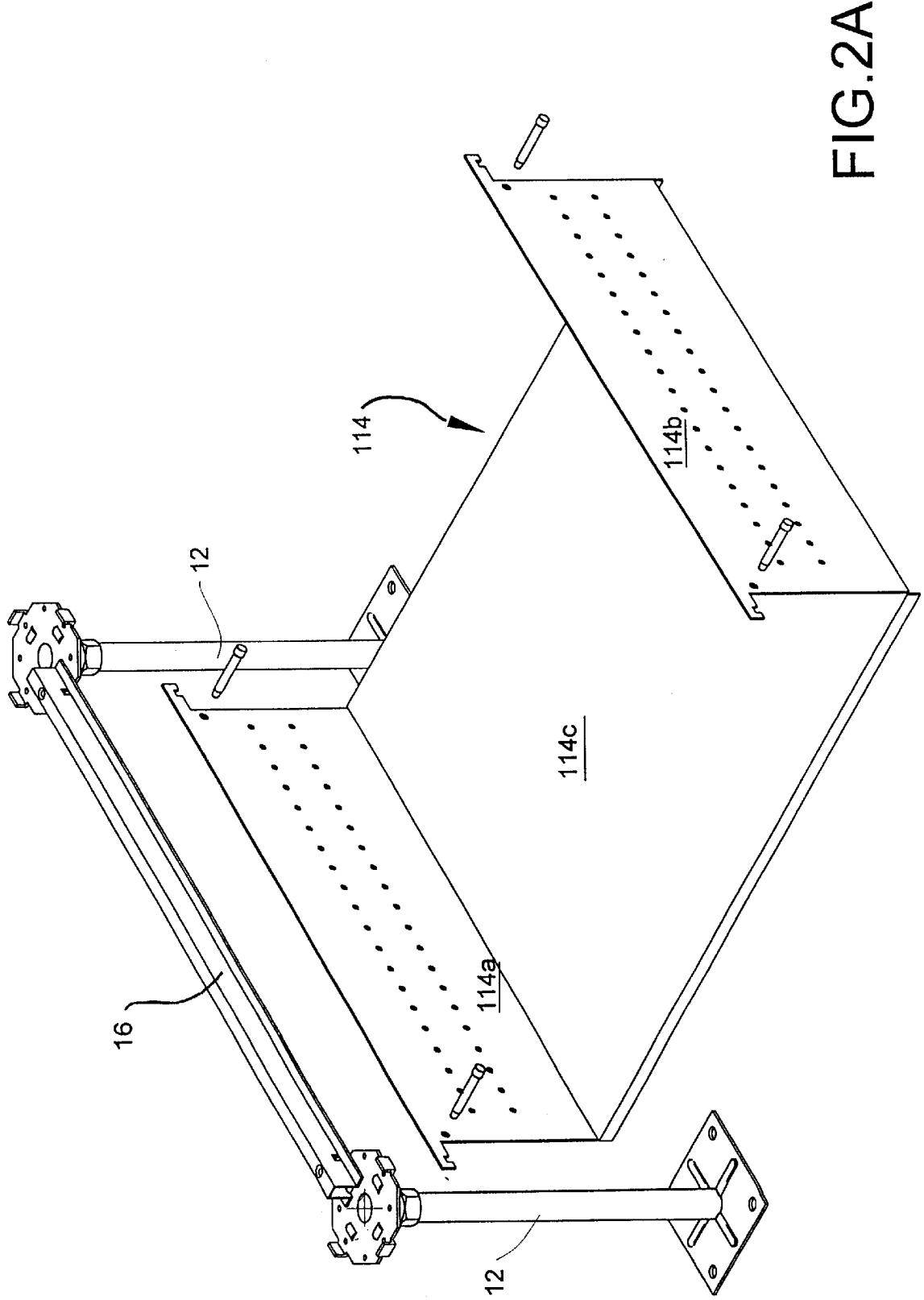

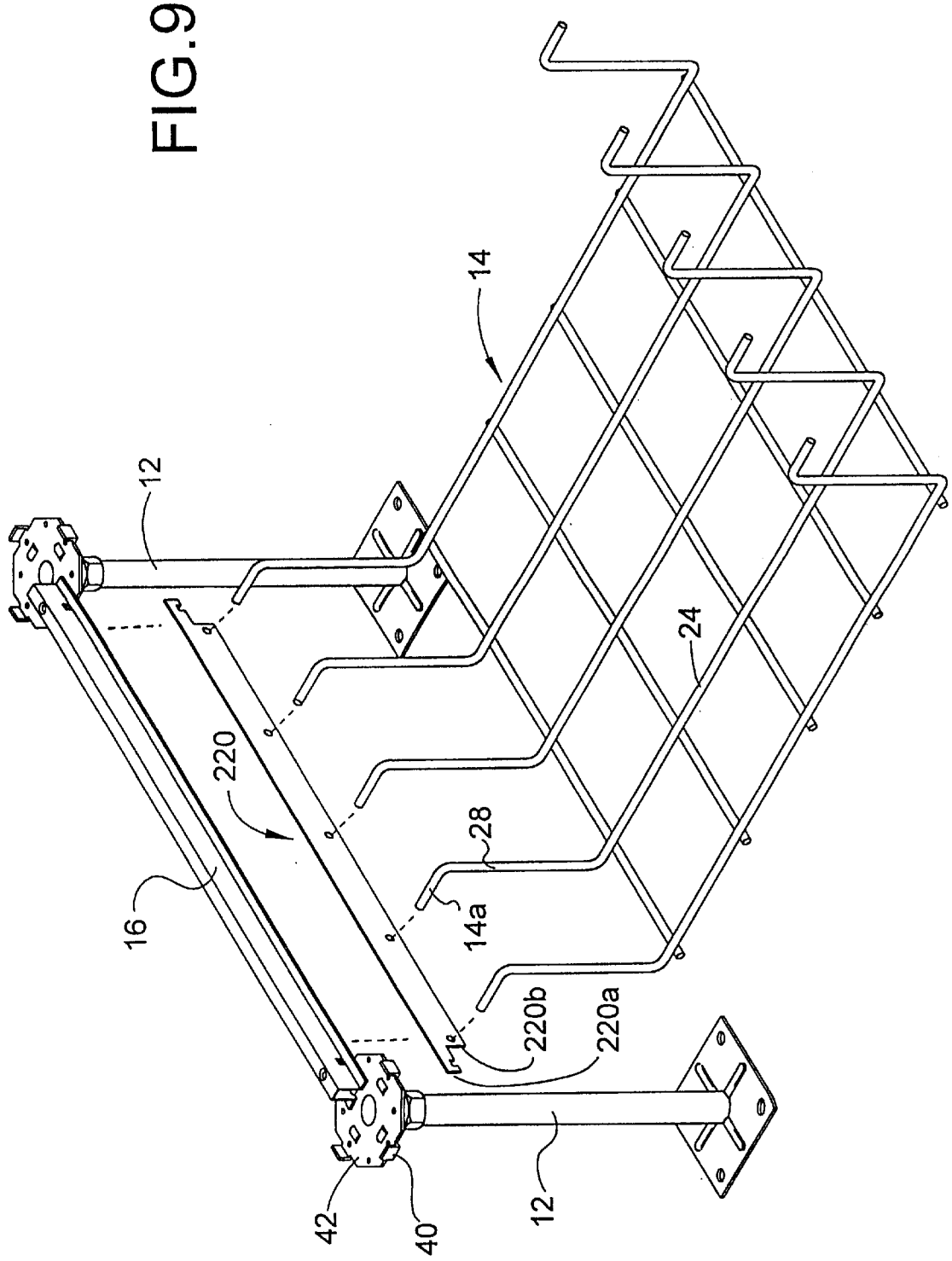

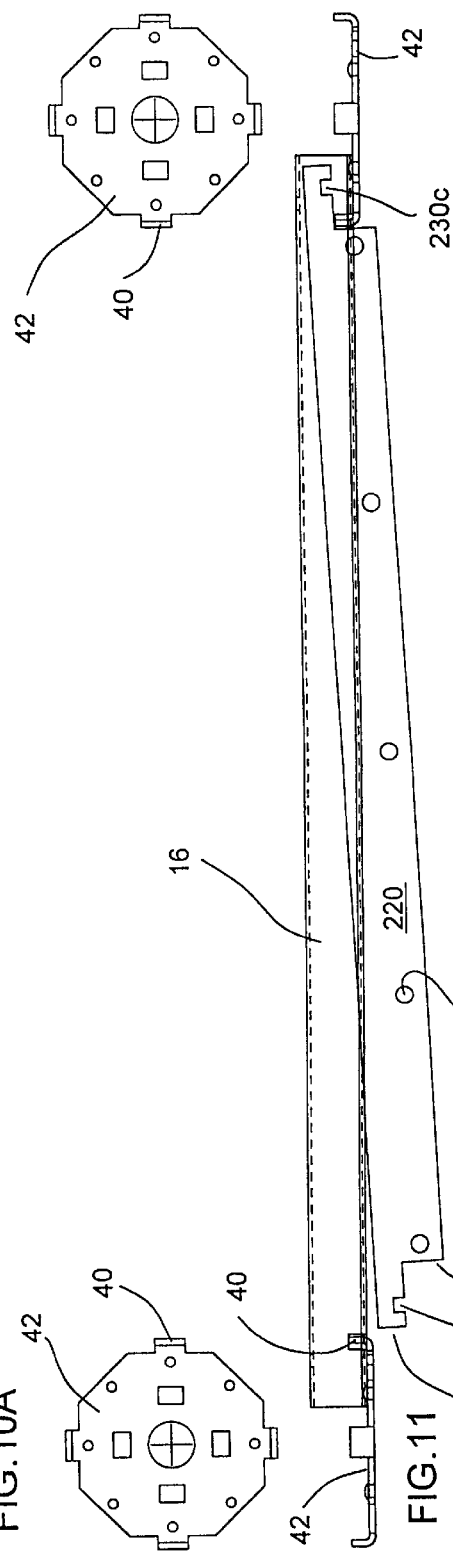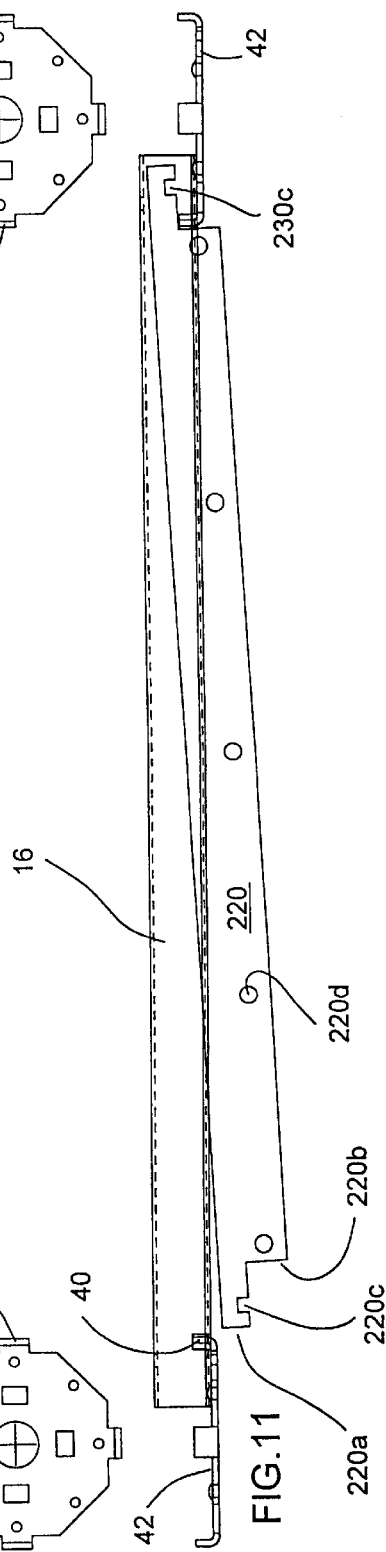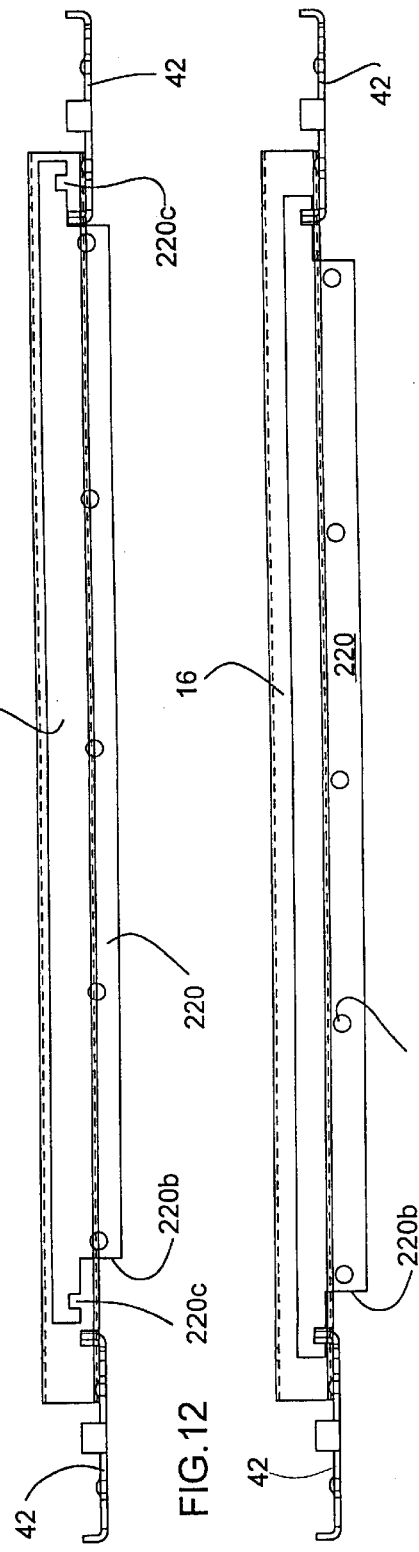

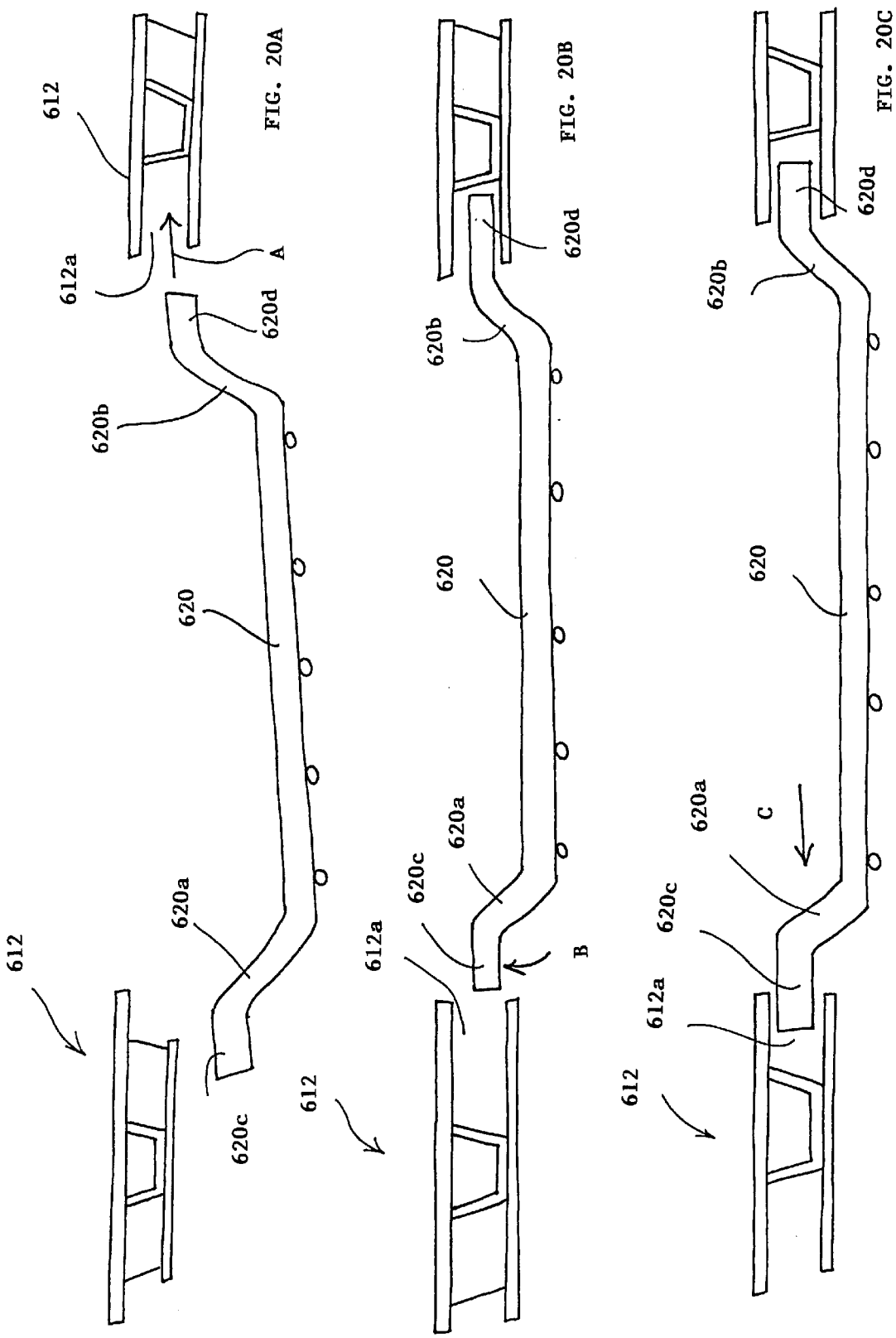

RAISED FLOOR SYSTEM AND SUPPORT APPARATUS

CROSS REFERENCE TO RELATED APPLICATIONS

The present application is a continuation-in-part of co-pending International Application Ser. No. PCT/US98/19051, with international filing date of Sep. 11, 1998; which application designates the United States of America, claims priority to U.S. application Ser. No. 60/063,426 filed Oct. 28, 1997 and U.S. application Ser. No. 08/927,506 filed Sep. 11, 1997 now 5,953,870, as a continuation-in-part application. The contents of each of these applications are hereby incorporated by reference in their entirety.

BACKGROUND

1. Technical Field

The present disclosure relates to raised floor systems and more particularly to a cable support assembly for use in connection with a raised floor system.

2. Description of Related Art

Raised floor systems have been developed to provide the additional utility space needed in various different conduit or cable intensive environments where the original construction did not provide adequate means of accommodating the vast amount of conduit or cable. For example, probably the most common environment requiring vast amounts of additional protected space is for large computing systems. Such installations were typically made in facilities which simply were not designed to accommodate the vast amount of cable runs required to operate the typical large computer system. Other applications where additional utility space is required include mechanical systems, e.g., heating, ventilating and air conditioning systems.

A common problem experienced in utilizing raised floor systems is maintaining organization of the various cables, conduits, pipes, etc. which are routed beneath the floor system. One solution to this problem is to provide a cable tray system beneath the floor panels of the raised floor to contain and direct cables along their respective pathways. An example of such a cable tray system is disclosed in U.S. Pat. No. 4,596,095 which issued on Jun. 24, 1986 to Chalfant (the "'095 Chalfant Patent"). The '095 Chalfant Patent features a modular cable tray assembly which is formed from modular sections which include a number of different components all of which must be separately assembled to form the cable tray. For example, the cable tray includes separate straight sections, horizontal bend sections, horizontal tee sections, horizontal cross-intersection sections, as well as splice plates to connect the various components to each other as well as supporting the assembled cable tray above the building floor. Such a cable tray assembly is, therefore, independent of the raised floor system.

One drawback of such a raised floor and cable support system is the additional labor required to assemble the various components of the separate raised floor and cable support systems. In geographic regions with particularly high labor rates, the cost of erecting such a labor intensive dual system could prove to be cost prohibitive.

Another drawback of such a system is that the amount of space required by the structural supporting components of the two separate systems leaves less space available for carrying and organizing larger numbers of cable runs.

Yet another drawback of installing independent raised floor and cable support systems is the cost of procuring the materials required for two separate support structures. These additional labor and material costs can significantly increase the overall cost of installing a complete system.

An alternative solution to supporting cable runs below a raised floor assembly is proposed in U.S. Pat. No. 5,548,932 which issued on Aug. 27, 1996 to Mead (the "'932 Mead Patent"). The '932 Mead Patent features a height adjustable cable tray support system which includes a number of separate components which must be assembled to form the cable support system. Plates which support the cable tray are secured by welding or other methods to the pedestals of the existing raised floor system featured in the '932 Mead Patent. Additionally, support rods are required in the '932 Mead Patent cable tray support system, which support the cable tray on the support plates.

One disadvantage of such a system is the labor intensive nature of the installation. In particular, each support plate must be separately secured to the floor system pedestals and the support rods and cable tray sections must be installed. This combined with the cost of the material components required for such a system can add significant cost to the installation of the complete system.

Accordingly, there is a continuing need for improved raised floor and cable management systems which require fewer number of components. A need also exists for raised floor and cable management systems which are easier to install than existing systems and which provide increased storage capacity and accessibility.

SUMMARY

The present disclosure provides a raised floor system which overcomes the above-noted and other disadvantages of existing raised floor and cable management systems. Additionally, the present disclosure provides a raised floor system which requires many fewer components to assemble thereby resulting in greatly reduced material and labor costs to install a complete raised floor and cable management system or to upgrade an existing raised floor system with the presently disclosed cable support assembly.

In one aspect of the present disclosure a raised floor system is provided which includes a raised floor system, which includes a plurality of support pedestals; a plurality of floor panels; and a cable support apparatus which includes: a first elongated stringer element defining a horizontally disposed surface which is configured and dimensioned to support a portion of at least one of the plurality of floor panels, the first elongated stringer element being supported a predetermined distance away from a base by a first pair of the plurality of support pedestals; a second elongated stringer element defining a horizontally disposed surface which is configured and dimensioned to support a portion of at least one of the plurality of floor panels, the second elongated stringer element being supported a predetermined distance away from a base by a second pair of the plurality of support pedestals and channel section suspended from the first and second stringer elements, the channel section being configured and dimensioned to support lengths of cable thereon.

The channel section may be formed of an open architecture defining a plurality of openings therein. Additionally, the channel section may be formed of wire stock. The channel section may further include a plurality of support members extending from the first elongated stringer element to the second elongated stringer element. In such an arrangement, the plurality of support members are preferably maintained at a predetermined distance from each other.

The channel section may be suspended from the first and second elongated stringers by permanently securing the channel section to the first and second elongated stringers.

In another aspect of the present disclosure a cable support apparatus is provided for use with a raised floor system including a plurality of support pedestals and floor panels. The cable support apparatus includes first and second stringer elements, each of the stringer elements being adapted for removable engagement with respective support pedestals of a raised floor system such that the first and second stringer elements interconnect the respective support pedestals of the raised floor system, each of the first and second stringer elements defining a horizontally disposed upper surface which is configured and dimensioned to support a portion of a floor panel of the raised floor system; and a channel section suspended from the first and second stringer elements, the channel section being configured and dimensioned to support lengths of cable thereon.

In yet another aspect of the present disclosure, a modular cable support assembly is provided which includes a plurality of support pedestals; a plurality of cable support apparatus each of which includes: a first elongated stringer element defining a horizontally disposed upper surface thereof which is configured and dimensioned to support at least a portion of a floor panel, the first elongated stringer element being supported a predetermined distance away from a base by a first pair of the plurality of support pedestals; a second elongated stringer element defining a horizontally disposed upper surface thereof which is configured and dimensioned to support at least a portion of a floor panel, the second elongated stringer element being supported a predetermined distance away from a base by a second pair of the plurality of support pedestals; and a channel section suspended from the first and second stringer elements, the channel section being configured and dimensioned to support lengths of cable thereon.

In a still further aspect of the present disclosure, a cable support apparatus is provided for use with a raised floor system including a plurality of support pedestals, stringers and floor panels, the cable support apparatus including a channel section configured and dimensioned to support lengths of cable thereon; and means for suspending the channel section from the stringers of the raised floor system. The channel section may be formed of an open architecture.

In a further embodiment, the present disclosure provides a support apparatus for use with a raised floor system including a plurality of support pedestals and floor panels. The support apparatus includes a support bracket having first and second end portions being configured and dimensioned to rest upon at least a portion of a support pedestal of a raised floor system and beneath a floor panel of the raised floor system. The embodiment also includes an intermediate portion extending between the first and second end portions, and an article support member depending from the intermediate portion to support articles thereon a distance below the raised floor panels and a distance above a base.

A still further embodiment includes first and second support brackets each having first and second end portions being configured and dimensioned to rest upon at least a portion of a support pedestal of a raised floor system and beneath a floor panel of the raised floor system, and an intermediate portion extending between the first and second end portions, an article support member depending from the first and second support brackets to support articles thereon a distance below the raised floor panels and a distance above a base.

The present disclosure also provides a method of installing a support apparatus in a raised floor system including a plurality of support pedestals and floor panels. The method includes the steps of inserting a first end portion of a support bracket configured and dimensioned to fit in an opening defined at least partially by a portion of a first support pedestal disposed beneath a floor panel, moving the first end portion of the support bracket laterally towards the first support pedestal such that a second end portion of the support bracket moves away from a second support pedestal spaced a predetermined distance away from the first support pedestal, elevating the second end portion of the support bracket into horizontal alignment with an opening defined at least partially by a portion of the second support pedestal, and moving the second end portion of the support apparatus toward the second support pedestal such that the first and second end portions of the support apparatus are positioned in the respective openings defined at least partially by portions of the first and second support pedestals.

BRIEF DESCRIPTION OF THE DRAWINGS

Preferred embodiments of the presently disclosed raised floor system and cable support assembly are described herein with reference to the drawings, wherein:

FIG. 2A is a perspective view of an alternative embodiment of a cable support assembly constructed in accordance with the present disclosure;

FIG. 9. is a perspective view with parts separated of one embodiment of a secondary support apparatus and components of a raised floor assembly, constructed in accordance with the present disclosure;

FIG. 10A is a top view of a bearing surface of a support pedestal;

FIG. 10B is a top view of a bearing surface of a further support pedestal;

FIG. 11 is a side view of an assembly sequence of a secondary support apparatus;

FIG. 12 is a side view of a further assembly sequence of a support apparatus;

FIG. 13 is a side view of a further assembly sequence of a support apparatus;

FIG. 20A is a side schematic view of an installation step for the embodiment of FIG. 19;

FIG. 20B is a view similar to FIG. 20A of a further installation step; and

FIG. 20C is a further view similar to FIGS. 20A and 20B of a further installation step.

DETAILED DESCRIPTION OF PREFERRED EMBODIMENTS

Figure 1:
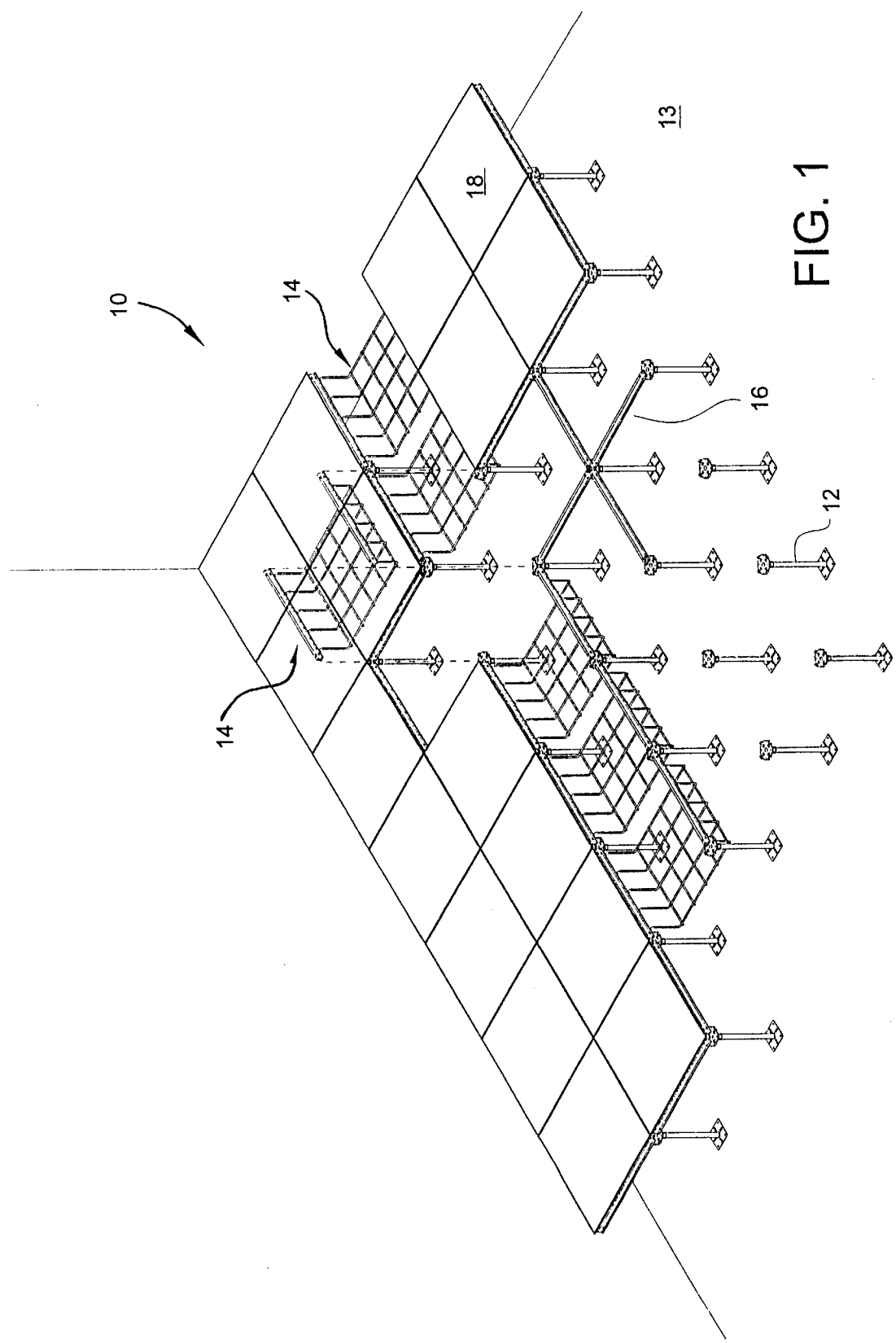
FIG. 1 is a perspective view of one embodiment of a raised floor system constructed in accordance with the present disclosure.

Referring now in specific detail to the drawings in which like reference numerals identify similar or identical elements throughout the several views, and initially to FIG. 1, one embodiment of a raised floor system constructed in accordance with the present disclosure is shown generally as raised floor system 10.

Generally, raised floor system 10 includes a series of support pedestals such as stanchions 12 which are disposed in a predetermined array on a base such as floor 13. A cable support assembly is provided in raised floor system 10 and includes a series of cable support apparatus such as cable baskets 14 which are disposed relative one another to form a predetermined passageway for carrying cables or the like thereon. Preferably cable baskets 14 form an integral part of floor system 10. Stanchions 12 are interconnected by stringer members 16 so as to define a lattice work which receives individual floor panels 18 therein to form the completed raised floor system 10.

In certain installations it may be desirable or necessary to install the cable support assembly as a stand-alone modular assembly. It is within the scope of the present disclosure, that in such an installation, cable baskets 14 will be supported a predetermined distance above the building floor 13 by independent stanchions 12 or other suitable supports which are not also used to support the raised floor system 10.

Figure 2:
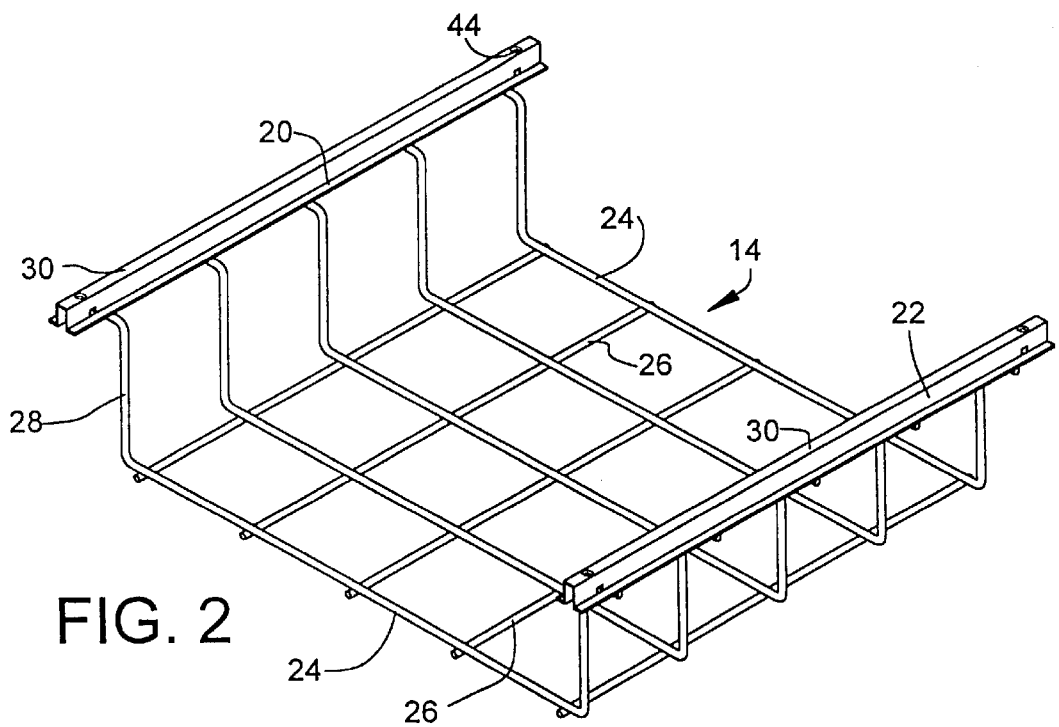
FIG. 2 is a perspective view of a cable support assembly embodiment constructed in accordance with the present disclosure.

Referring now to FIG. 2, cable basket 14 includes first and second elongated stringer elements 20 and 22, respectively. A channel section is suspended from stringers 20 and 22 so as to form a portion of a passageway for supporting cable runs thereon. In the illustrated embodiment, the channel section is formed of an open ended wire stock basket having longitudinal sections 26 attached to transverse sections 24. Transverse sections 24 include riser portions or legs 28 which are attached to the underside of stringers 20 and 22. The various elements of cable support assembly 14 are preferably joined by suitable known techniques, such as by welding.

Although the illustrated channel sections are formed of wire stock material, it is within the scope of the present disclosure to use other materials as well. For example, the channel section may be formed of solid or woven fabrications of various metals or any other material suitable for supporting cable runs thereon. One illustrative example of such an alternative channel section is shown in FIG. 2A wherein channel section 114 includes vertical side wall portions 114A and 114B which extend upwardly from a central horizontal bottom panel 114C. Such a channel section 114 may be particularly useful in supporting equipment or the like above the base or building floor. Also illustrated in FIG. 2A is an alternative mounting system which will be described in greater detail in connection with the embodiment of FIGS. 9–14.

Figure 3:
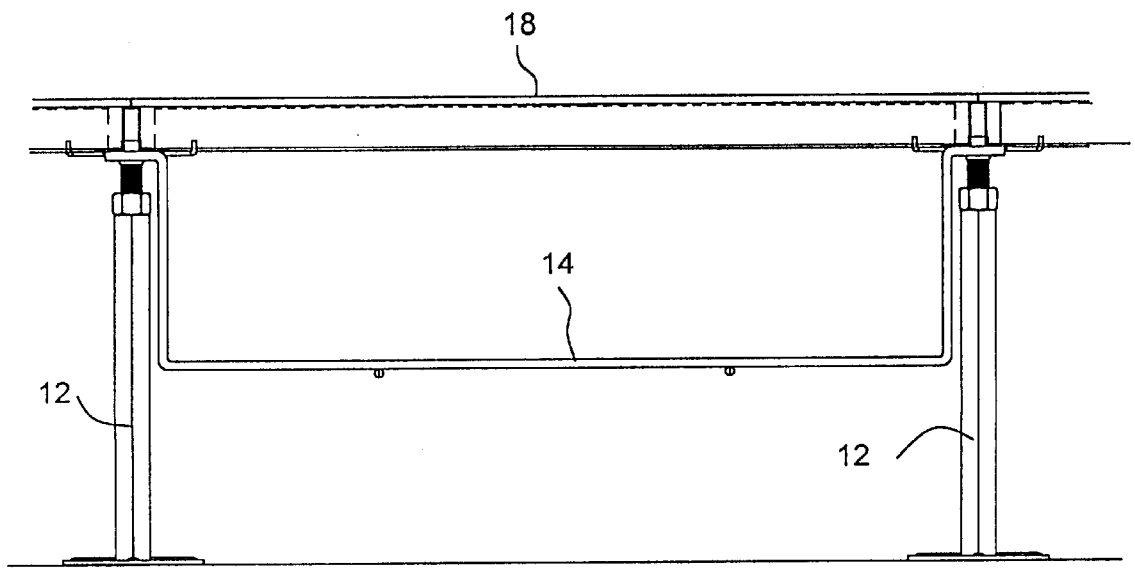
FIG. 3 is a side view of the cable support assembly of FIG. 2 in place in a raised floor system.
Figure 5:
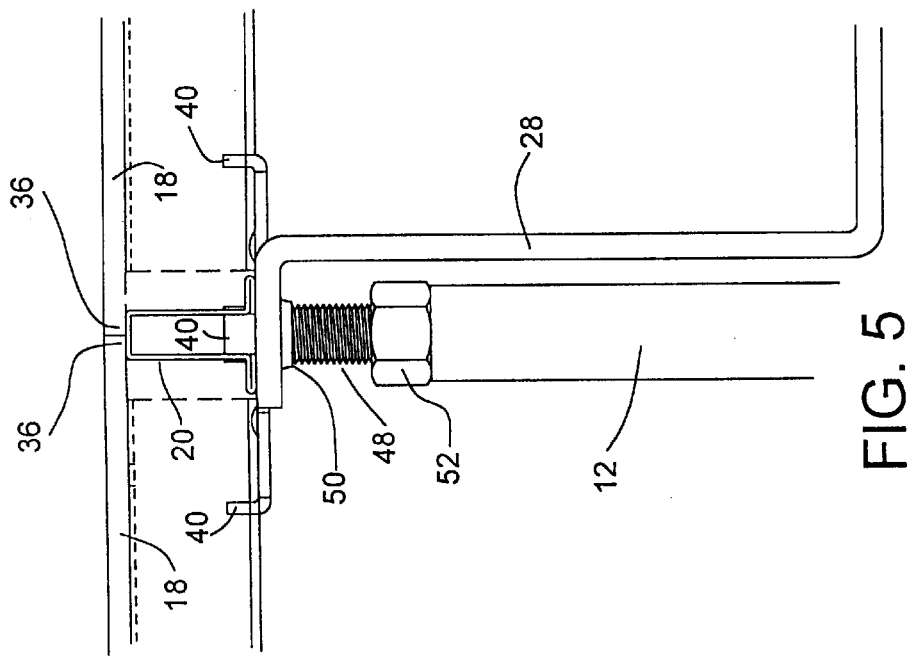
FIG. 5 is a side view showing the cable support assembly partially cut away as installed in the raised floor system of the present disclosure.
Figure 4:
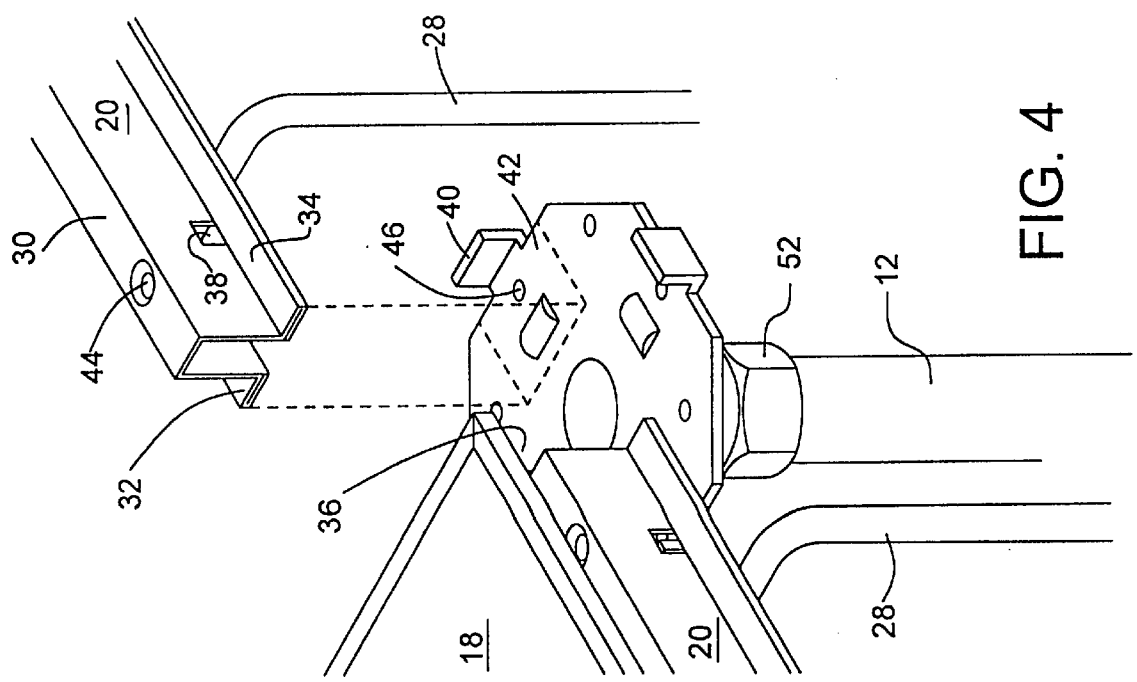
FIG. 4 is an enlarged partial perspective view of a cable support assembly in a raised floor system of the present disclosure.

Referring now to FIGS. 3–5, the integration of cable baskets 14 into raised floor system 10 will now be described in detail. Preferably, a single section of cable basket 14 is supported by four stanchions 12 (as shown in FIG. 1). However, it is within the scope of the present disclosure that cable baskets 14 may be modified so as to be supported by more or less than four stanchions 12.

As shown in FIG. 3, cable baskets 14 are supported by stanchions 12 such that the longitudinal and transverse elements 26 and 24 respectively are spaced a predetermined distance from the permanent floor 13. When installed, cable baskets 14 do not interfere with the placement or fit of floor panels 18. Rather, cable baskets 14 are designed to be incorporated into existing raised floor systems without departing from the factory design specifications of the floor system. For such installations, cable baskets 14 replace parallel end to end links of stringers 16 from the existing raised floor system.

As shown in FIG. 4, cable support assembly sections 14 include stringer elements such as stringers 20 and 22 which have a cross sectional "top hat" shape that includes an inverted U-shaped cross section portion having flanges 32 and 34 formed on either side. Horizontal surface 30 forms the uppermost surface of stringers 20 and 22. It is on surface 30 which a peripheral flange 36 formed on floor panels 18 rests. As best illustrated in FIG. 5, the peripheral flanges 36 of adjacent floor panels 18 are both supported by a single stringer element 20 or 22 on surface 30. In order to maintain the relative positioning of stringer elements 20 and 22 with respect to stanchion 12, stringer elements 20 and 22 are provided with notched portions 38 which are configured and dimensioned to fit over bracket portions 40 of stanchion base plate 42.

Stringer elements 20 and 22 are further provided with preformed holes 44 which when properly installed are vertically aligned with preformed holes 46 formed in stanchion base plate 42. In this manner, stringer elements 20 and 22 may be secured to stanchion 12 to provide added structural integrity to the overall system. As is common in conventional floor systems, floor system 10 is preferably provided with a height adjustment mechanism to adjust the height of stanchion base plate 42 in order to accommodate slight variances in the subfloor 13. This height adjustment capability may be facilitated by, for example, threaded stud 48 being received in a threaded bore 50 formed in base plate 42 at one end and in a threaded opening of stanchion 12. A nut 52 is provided and is threaded around stud 48 positioned adjacent the top of stanchion tube to facilitate adjustment and locking of the vertical positioning of base plate 42.

Figure 6:
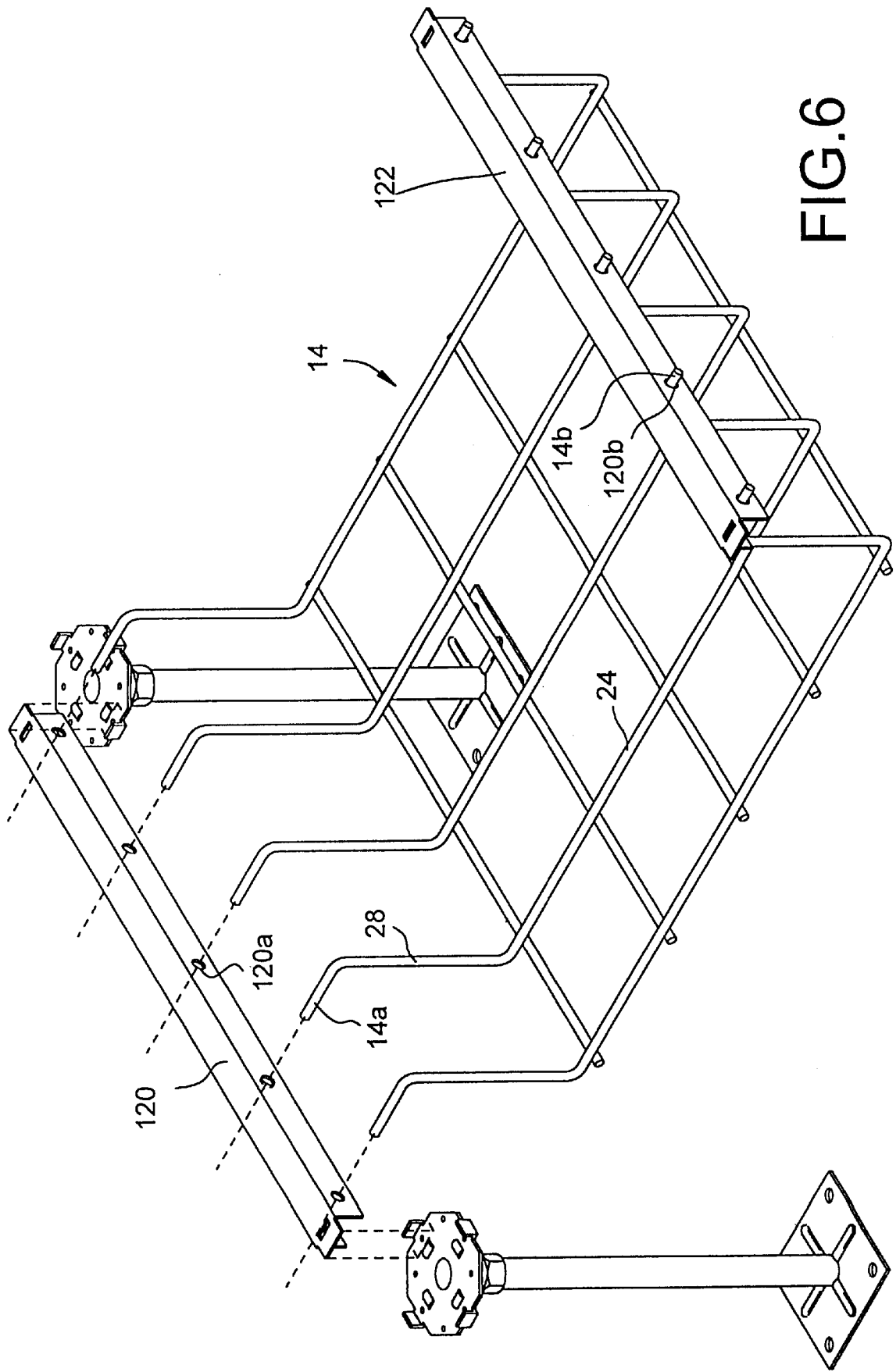
FIG. 6 is a perspective view of a further embodiment of the presently disclosed cable support assembly.

Referring to FIG. 6, an alternative method of attaching the cable basket to the stringers is shown wherein cable basket 14 has portions 14a and 14b which are formed extending outwardly from the upper portions of riser legs 28. Stringers 120 and 122, which are otherwise the same as stringers 20 and 22, are provided with a series of through-holes 120a and 120b, respectively, which may be punched out during formation of the stringers. In this manner, cable basket 14 may be suspended from stringers by inserting leg portions 14a and 14b in through-holes 120a and 120b. It is envisioned that all of the stringers of a raised floor system may be provided with through-holes similar to 120a and 120b so that a cable support system may be installed at any time and placed between any parallel rows of stringers having such support holes.

Alternatively, in existing raised floor systems which do not already have stringers with pre-formed cable basket receiving holes, such as holes 120a and 120b, the stringers positioned where it is desired to support a series of cable baskets 14 could be replaced with stringers having the pre-formed holes.

Figure 7:
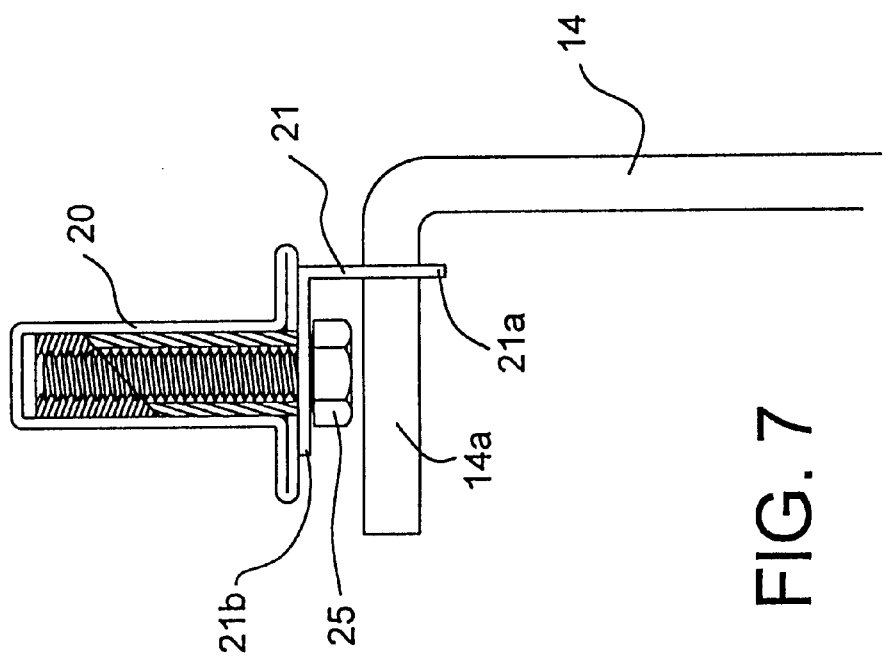
FIG. 7 is a side partial view of an alternative embodiment for mounting the cable support assembly to stringers of a raised floor system.

Referring to FIG. 7, in another alternative embodiment for suspending cable baskets 14 from stringers 20, angled brackets 21 are provided which have leg portions 21a and 21b. Leg portion 21a includes a through hole (shown in phantom lines) which receives leg portion 14a of cable basket 14. Leg portion 21b is bolted into the channel formed in the underside of stringer 20 by an expanding fastener such as wedge-bolt 25.

Figure 8:
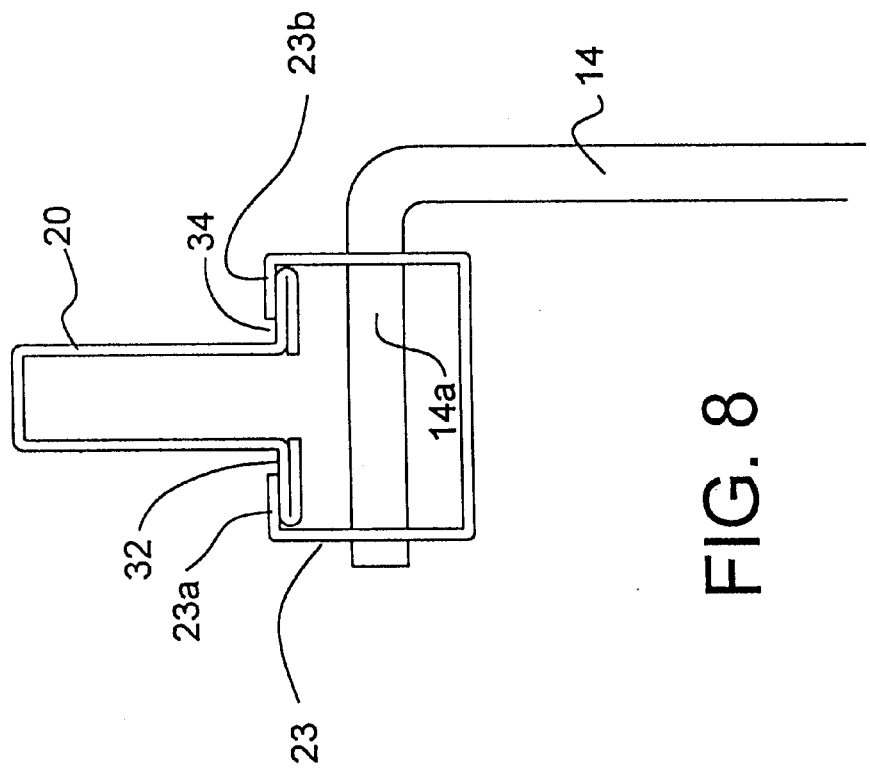
FIG. 8 is a side partial view of a further alternative embodiment for mounting the cable support assembly to stringers of a raised floor system.

Referring to FIG. 8, in a still further alternative embodiment for suspending cable baskets 14 from stringers 20, a series of clips 23 are positioned on stringers 20 by having leg portions 23a and 23b rest upon flanges 32 and 34, respectively. Leg portions 14a of baskets 14 are inserted into receiving holes formed in clips 23. Thus, baskets 14 are suspended from clips 23. In this manner, existing floor system stringers could be utilized to support the added cable baskets defining the cable support assembly.

Referring now to FIGS. 9–14, a secondary support apparatus for use in conjunction with a raised floor system will now be described in detail. A support bracket 220 is provided which is configured and dimensioned to support an article support member such as basket 14. Basket 14 has been described with respect to previously described embodiments of the present disclosure and will not be addressed in further detail herein.

In the embodiment illustrated in FIG. 9, only one frame 220, one pair of pedestals 12, and one stringer element 16 are shown. A second pair of pedestals 12, stringer element 16, floor panel 18 (FIG. 1), and flame 220 which are identical to the illustrated structure form part of one section of a raised floor system but are not shown for sake of clarity.

Support bracket 220 is preferably stamped out of a flat metal stock and is configured and dimensioned to depend from an adjacent pair of pedestals 12 of a raised floor assembly. However, it is envisioned that for different applications, support bracket may be formed of materials having other cross-sectional geometries, such as for example, round stock.

Support bracket 220 is particularly adapted to be installed in an existing raised floor assembly, such as the one illustrated in FIG. 1. However, support bracket 220 advantageously does not require the removal or substitution of the existing stringer elements 16 of the raised floor assembly. Installation of frames 220 does not alter the configuration or compromise the existing raised floor assembly.

Referring to FIGS. 10A–13, support bracket 220 includes an upper portion 220a and a lower portion 220b. Lower portion 220b extends downwardly away from upper portion 220a. Support bracket 220 includes notches 220c formed in the lower edges of transversely extending portions which extend out each end of support bracket 220.

To install support bracket 220, as shown in FIG. 11, a first end is inserted in the U-shaped opening of stringer element 16 and passed over bracket portion 40 of stanchion base plate 42. Support bracket 220 is slid over until the second end is clear of bracket portion 40 of stanchion base plate 42 of the adjacent pedestal 12. As shown in FIG. 12, the second end of support bracket 220 is elevated until the transversely extended portion is clear of the top of bracket portion 40. Finally, as shown in FIG. 13, support bracket 220 is moved so that notches 220c align with the respective bracket portions 40 of stanchion base plates 42 and support bracket is lowered so that notches 220c rest on the respective bracket portions 40.

Figure 14:
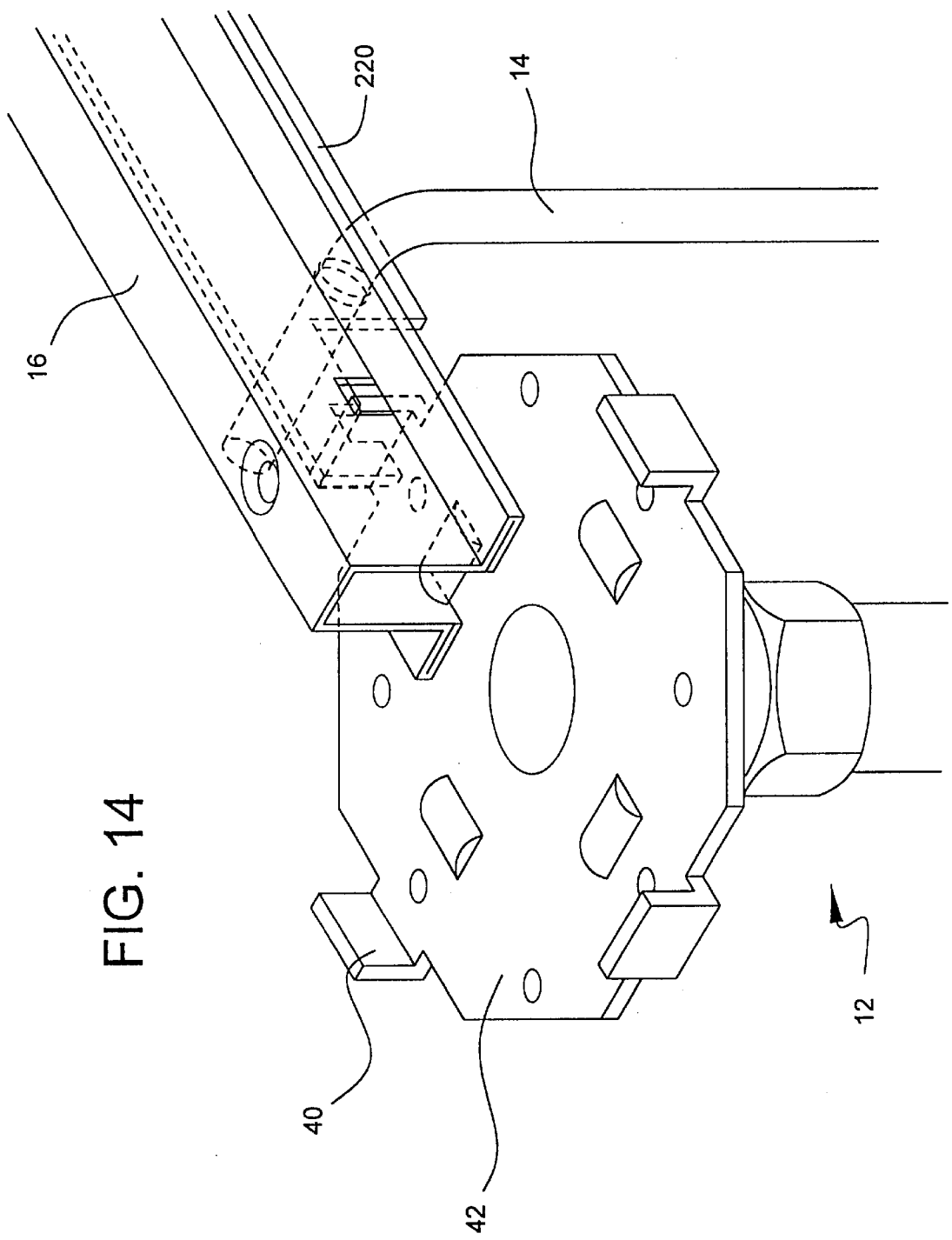
FIG. 14 is an enlarged partial perspective view showing one end of a secondary support apparatus assembled in a raised floor support system.

In this manner, mounting holes which are formed in the lower portion 220b are situated below the bottom of stringer elements 16. Thus, as shown in FIG. 14, basket 14 may then be inserted in a similar fashion as shown and described with respect to the embodiment of FIG. 6. Once installed, basket 14 is locked in place.

Figure 15:
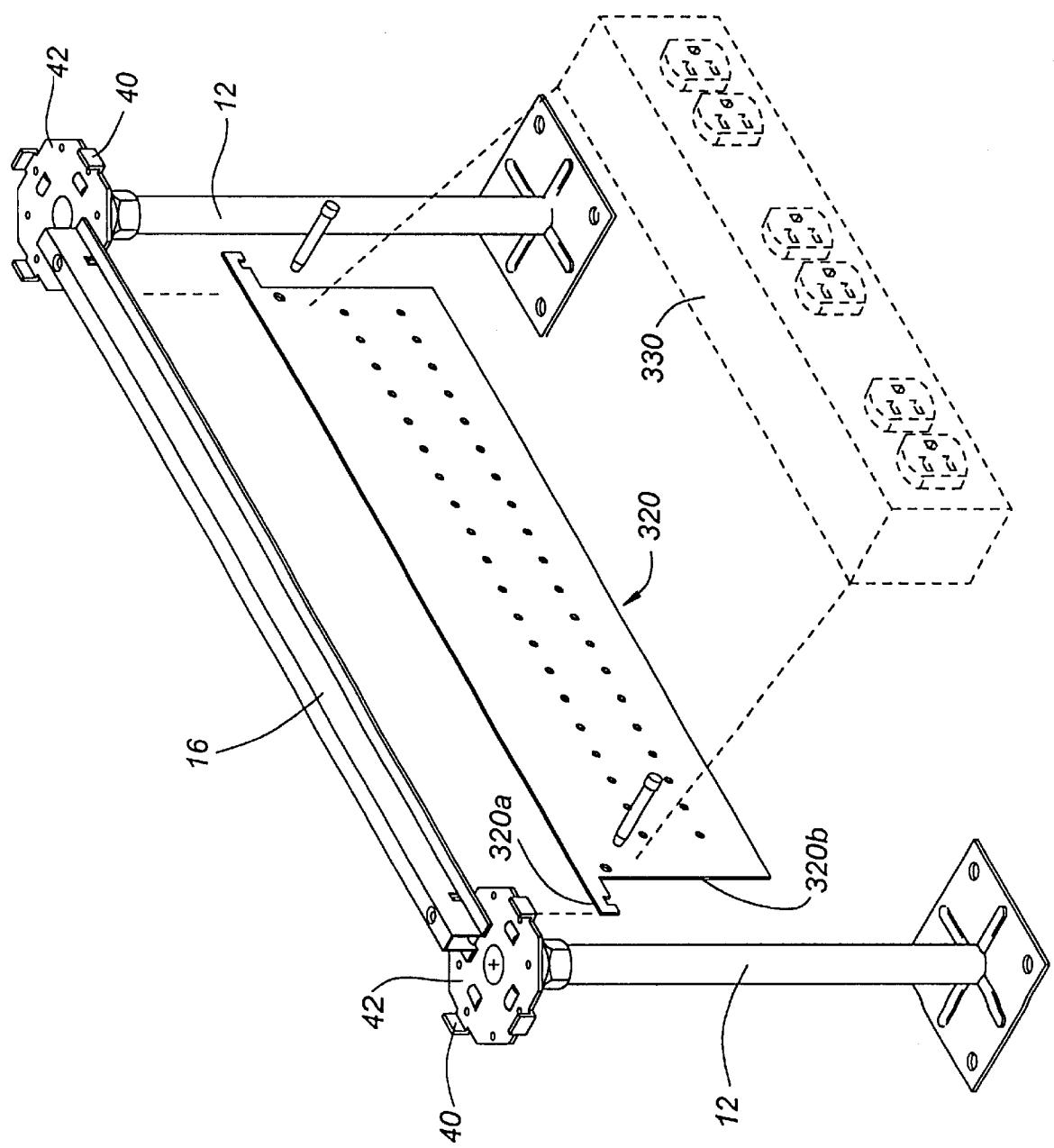
FIG. 15 is a perspective view with parts separated of a further embodiment of a secondary support apparatus and components of a raised floor assembly, constructed in accordance with the present disclosure.

A further embodiment of a support apparatus for use in conjunction with a raised floor assembly is illustrated in FIG. 15 as support bracket 320. Support bracket 320 includes similar mounting structure to support bracket 220. Support bracket 320 includes lower portion 320 which extends downwardly a predetermined distance from upper portion 320a. Lower portion 320b may be any desired length up to the limit imposed by whatever surface, be it planar or irregular, is between adjacent pedestals 12. Thus, lower portion 320b provides a mounting surface which is suspended above the surface which the raised floor assembly is positioned over. In this manner, a variety of articles may be supported below the floor panels of the raised floor assembly but above the surface upon which the raised floor assembly rests. For example, a power strip 330 may be mounted to support bracket 320.

Figure 16:
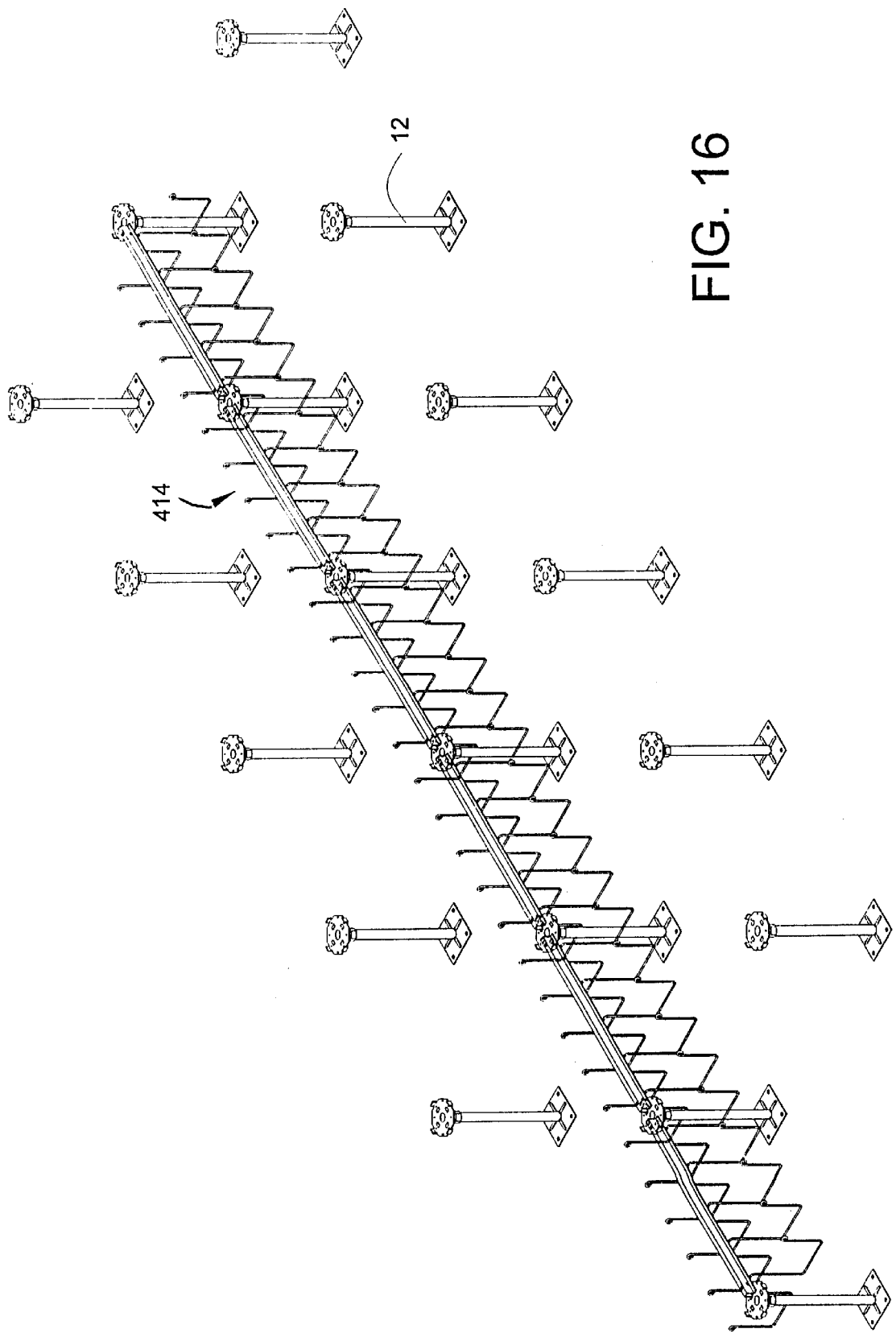
FIG. 16 is a perspective view of an alternative embodiment of a cable support assembly incorporated in a raised floor support system constructed in accordance with the present disclosure.
Figure 17:
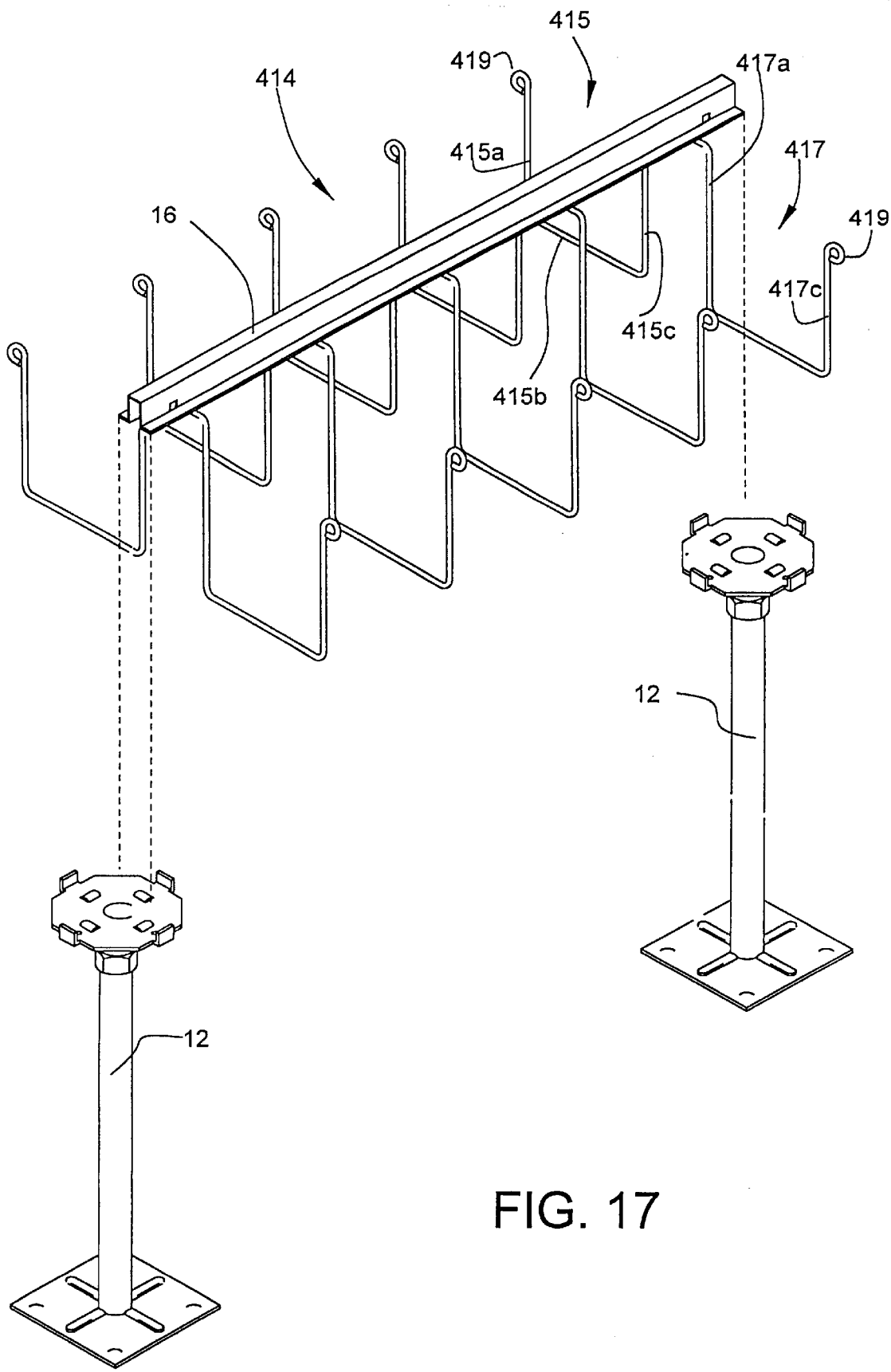
FIG. 17 is a perspective view with parts separated of one section of a cable support assembly of the embodiment of FIG. 16.

Referring to FIG. 16, an alternative embodiment of a cable support assembly as incorporated in the structural support system of a raised floor system is shown disposed along a single linear array of stanchions 12 of a raised floor system. As shown in FIG. 17, a cable support assembly section 414 defines two separate cable support pathways which are defined by a series of spaced apart cable support bracket members each having a pair of partially enclosed areas 415 and 417 defined by segments 415a, 415b, 415c; and 417a, 417b, 417c, respectively. The cable support brackets are preferably formed of stock which is readily formed into the desired shape such as illustrated in FIG. 17, for example, wire stock. Each of the cable support brackets are provided with a loop section 419 at the outboard ends of the partially enclosed areas 415 and 417. Loop sections 419 may be formed such that the loop is oriented outwardly from the partially enclosed areas 415 and 417, as illustrated in FIG. 17, or loops 419 may be formed to be oriented facing inwardly in the partially enclosed areas.

Figure 18:
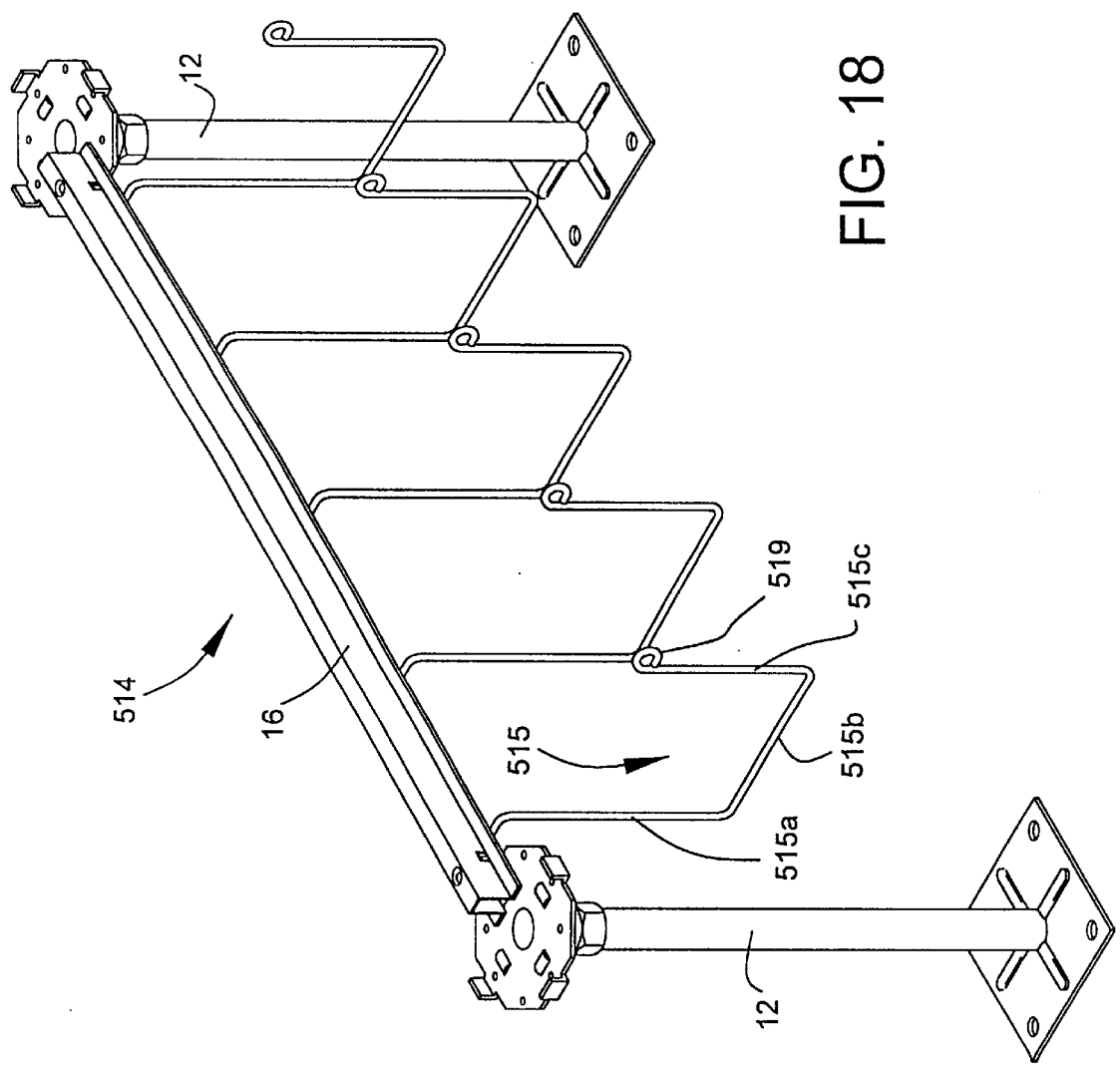
FIG. 18 is a perspective view of an alternative embodiment of a cable support assembly section constructed in accordance with the present disclosure.

FIG. 18 illustrates a further alternative embodiment of a cable support assembly section 514 which is similar to cable support assembly section 414 of FIG. 17 except that a single cable pathway is defined by a series of cable bracket members secured to a stinger element 16. Each of the cable support bracket members include a partially enclosed area 515 defined by segments 515a, 515b, and 515c. A loop portion 519 is also formed at the outboard end of the partially enclosed area 515 and may be formed as noted above with respect to FIG. 17.

Figure 19:
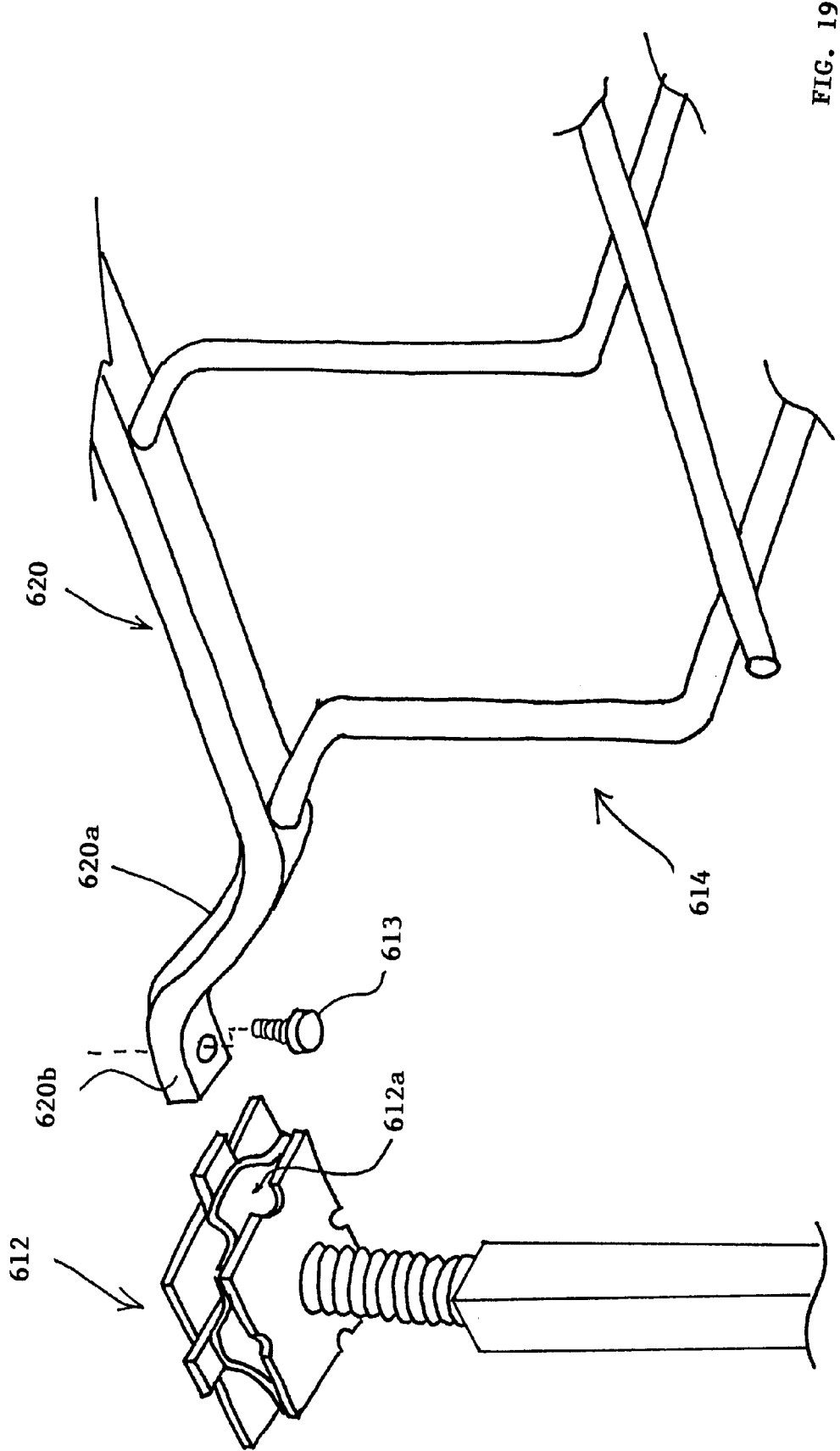
FIG. 19 is a partial perspective view of a further alternative embodiment of a support bracket.

Referring now to FIGS. 19–20C, a further alternative support apparatus embodiment for use in conjunction with a raised floor system will now be described in detail. A support bracket 620 is provided which is configured and dimensioned to support an article support member such as those featured in the previously described embodiments.

In FIGS. 19–20C, only one support bracket 620, and the top plate portion of one pair of pedestals 112, and a portion of a cable support basket 614 are shown. In one particularly useful application, a single support bracket 620 may be utilized to mount an article support member such as cable support assembly section 414 (FIGS. 16 and 17) or cable support section 514 (FIG. 18). The article support member may be either a single section like that shown in FIG. 15 or it may form a single section in a series of sections arranged to form one or more pathways for cables, as shown in FIG. 16.

Alternatively, a pair of support brackets may be utilized to support the two sides of broader article support member, such as cable support basket 614 (shown in partial view in FIG. 19). Cable support basket 614 is similar to basket 14 except that stringer element 16 is not utilized. Rather, support bracket 620 takes its place. In such an application, a second pair of pedestals 112, and support bracket 620 which are identical to the illustrated structure form the other half of the presently disclosed embodiment, but are not shown for sake of clarity.

In applications such as those exemplary illustrations described above as well as others envisioned within the scope of the present disclosure, instead of being attached to stringers 16, a series of article support members are attached to a series of support brackets 620, respectively. Such a configuration is particularly useful in raised floor systems wherein it is either not desired or not necessary to replace the stringers of a raised floor system or no separate stringer elements are present.

In a raised floor system which does not have separate stringer elements, the floor tiles themselves are configured and dimensioned to provide the necessary support to meet the load requirements for the floor system.

Installation of an assembled support structure which includes support bracket 620 is shown schematically in FIGS. 20A, 20B, and 20C. Such installation is similar to that of bracket 220 as shown and described in connection with FIGS. 11, 12, and 13. The principal difference being that bracket 620 includes neck portions 620a and 620b formed at either end. In this manner, bracket 620 facilitates the positioning of an attached article support member at a vertical level spaced a predetermined distance below the plane of the pedestal top portions 612. Brackets 620 thus provide greater versatility in that article support members attached thereto may be installed in raised floor systems which have stringers, as shown in FIGS. 9–13, or in raised floor systems which do not include stringers, as shown in FIGS. 19–20C.

As illustrated in FIGS. 20A, 20B, and 20C support bracket 620 is configured and dimensioned to fit in an opening 612a formed in the pedestal top portion 612, such that upper horizontal extensions 620c and 620d are alternately inserted into openings 612a of adjacent pedestals as illustrated by arrows "A", "B", and "C" in FIGS. 20A, 20B, and 20C.

Support brackets 620 are shown formed of rectangular cross-section bar stock. However, it is envisioned that for different applications, support brackets 620 may be formed of materials having other cross-sectional geometries.

Support brackets 620 are particularly adapted to be installed in an existing raised floor assembly which may or may not include separate stringer elements. This versatile feature is possible because, support brackets 620 advantageously do not require the removal or substitution of existing stringer elements 16 of raised floor assembly. Installation of support brackets 620 does not alter the configuration or compromise the existing raised floor assembly. Upon installation, support brackets 620 may be secured in place by suitable fasteners, such as, for example, set screw 613 shown in FIG. 19.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the present disclosure.

What is claimed is:

1. A method of installing a support apparatus in a raised floor system including a plurality of support pedestals and floor panels, comprising the steps of:

inserting a first end portion of a support bracket configured and dimensioned to fit in an opening defined at least partially by a portion of a first one of the plurality of support pedestals disposed beneath the floor panels of the raised floor system;

moving the first end portion of the support bracket laterally towards the first support pedestal such that a second end portion of the support bracket moves away from a second one of the plurality of support pedestals spaced a predetermined distance away from the first support pedestal;

elevating the second end portion of the support bracket into horizontal alignment with an opening defined at least partially by a portion of the second support pedestal; and moving the second end portion of the support bracket toward the second support pedestal such that the first and second end portions of the support apparatus are positioned in the respective openings defined at least partially by the portions of the first and second support pedestals.

2. A method of installing a support apparatus in a raised floor system including a plurality of support pedestals and floor panels, comprising the steps of:

placing a first end portion of a support bracket of the support apparatus on a surface portion of a first support pedestal of the plurality of support pedestals disposed beneath the floor panels of the raised floor system;

moving the first end portion of the support bracket section laterally towards the first support pedestal such that a second end portion of the support bracket moves away from a second one of the plurality of support pedestals spaced a predetermined distance away from the first support pedestal;

elevating the second end portion of the support bracket into horizontal alignment with a corresponding surface portion of the second support pedestal; and moving the second end portion of the support bracket toward the second support pedestal such that the first and second end portions of the support bracket rest upon the surface portions of the first and second support pedestals.

3. A method of installing a support apparatus in a raised floor system including a plurality of support pedestals and floor panels, the support apparatus including first and second support brackets and an article support member depending from the two support brackets, the method comprising the steps of:

placing first end portions of the first and second support brackets on respective surface portions of a first pair of support pedestals laterally disposed beneath the floor panels;

moving the first end portions of the two support brackets laterally towards the first pair of support pedestals such that second end portions of the two support brackets move away from a second pair of support pedestals laterally disposed to each other and spaced a distance away from the first pair of support pedestals;

elevating the second end portions of the two support brackets into horizontal alignment with corresponding surface portions of the second pair of support pedestals; and moving the second end portions of the two support brackets towards the second pair of support pedestals such that the first and second end portions of the two support brackets rest upon the surface portions of the first and second pairs of support pedestals.

4. An article support apparatus for use with a raised floor system that includes at least two support pedestals and at least two floor panels disposed on the support pedestals a distance above a base, the article support apparatus comprising:

at least one support bracket section including a first end portion and a second end portion, the first and second end portions adapted to be supported independently from the floor panels by portions of the at least two support pedestals beneath the floor panels of the raised floor system; and at least one article support section depending from the at least one support bracket section to support articles thereon a distance below the raised floor panels and above the base.

5. The support apparatus of claim 4 wherein the at least one support bracket section is a single support bracket section configured and dimensioned to rest upon a first support pedestal and a second support pedestal, and at least one article support section depends from the single support bracket section.

6. The support apparatus of claim 5 wherein the at least one article support section is adapted to support articles in one lateral area disposed below the single support bracket section.

7. The support apparatus of claim 5 wherein the single article support section is adapted to support articles in two lateral areas disposed below the single support bracket section.

8. The support apparatus of claim 4 wherein the at least one support bracket section comprises two support bracket sections configured and dimensioned to rest upon first and second pairs of support pedestals, and at least one article support section depending from the two support bracket sections.

9. The support apparatus of claim 4 wherein the at least one article support section is formed of wire stock configured and dimensioned to support articles thereon.

10. The support apparatus of claim 4 wherein the first and second end portions of the at least one support bracket are formed of bar stock configured and dimensioned to rest upon the support pedestals.

11. The support apparatus of claim 10 wherein the at least one support bracket has a rectangular cross-sectional geometry.

12. An article support apparatus for use with a raised floor system that includes at a plurality of support pedestals arranged in a matrix and a plurality of floor panels disposed on the support pedestals a distance above a base, the article support apparatus comprising:

a single stringer member including a first end portion and a second end portion, the first and second end portions adapted to be supported respectively by portions of two adjacent support pedestals positioned on one side of one of the plurality of floor panels of the plurality of support pedestals beneath the floor panels of the raised floor system; and an article support section depending from the single stringer member to support articles thereon a distance below the raised floor panels and above the base.

13. The article support apparatus of claim 12 wherein the article support section defines a horizontal pathway substantially parallel to the two adjacent support pedestals.

14. The article support apparatus of claim 12 wherein the article support section includes a series of individual support elements depending from the stringer member.

15. The article support apparatus of claim 14 wherein the individual support elements are formed of wire stock material.

16. The raised floor system of claim 14 wherein the at least one article support section is of a panel configuration adapted to hold articles thereon.

17. A raised floor system comprising:

a plurality of support pedestals;

a plurality of floor panels directly supported by top portions of the plurality of support pedestals; and an article support apparatus which includes:
at least one support bracket section adapted to be supported by surface portions of the plurality of support pedestals independent of the plurality of floor panels at a predetermined distance below the plurality of floor panels; and
at least one article support section depending from the at least one support bracket section to support articles thereon below the plurality of floor panels.

18. The raised floor system of claim 17 wherein the plurality of support pedestals include openings to receive the end portions of the at least one support bracket section.

19. The raised floor system of claim 17 wherein the at least one article support section is formed of a wire-stock configuration depending from the at least one support bracket section and adapted to support articles thereon.

20. A raised floor system comprising:

a plurality of support pedestals;

a plurality of floor panels supported by respective first surface portions of the plurality of support pedestals; and an article support apparatus which includes:
at least one support bracket section including first and second end portions adapted to be supported by respective second surface portions of first and second support pedestals of the plurality of support pedestals, the second surface portions being positioned a predetermined vertical distance away from the first surface portions; and
at least one article support section extending between the first and the second end portions of the at least one support bracket section to support articles thereon independent from and at a predetermined distance below the plurality of floor panels.

* * * * *